(12) United States Patent
Fatehi et al.

(10) Patent No.: US 6,192,172 B1
(45) Date of Patent: Feb. 20, 2001

(54) OPTICAL WAVELENGTH-SPACE CROSS-CONNECT SWITCH ARCHITECTURE

(75) Inventors: Mohammad Taghi Fatehi, Middletown; Wayne Harvey Knox, Holmdel, both of NJ (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/370,824

(22) Filed: Aug. 9, 1999

(51) Int. Cl.[7] ..................................................... G02B 6/26
(52) U.S. Cl. .................... 385/17; 385/24; 385/46; 385/16; 385/20; 359/124; 359/128
(58) Field of Search ........................... 385/17, 15, 16–24, 385/37, 46; 359/117–119, 123–128, 130, 133; 370/427, 490

(56) References Cited

U.S. PATENT DOCUMENTS

| | | | |
|---|---|---|---|
| 5,446,809 | 8/1995 | Fritz et al. | 385/17 |
| 5,694,234 | 12/1997 | Darcie et al. | 359/125 |
| 5,712,932 | 1/1998 | Alexander et al. | 385/24 |
| 6,055,348 | * 4/2000 | Jin et al. | 385/37 |
| 6,067,389 | * 4/2000 | Fatehi et al. | 385/17 |

OTHER PUBLICATIONS

Dan Sadot et al., "Tunable Optical Filters for Dense WDM Networks", IEEE Communicaitons Magazine, Dec. 1998, pp. 50–55.

Daniel Y. Al–Salameh et al., "Optical Networking", Bell Labs Technical Journal, vol. 3, No. 1, Jan./Mar. 1998, pp. 39–61.

U. S. Patent application of S. Jin 160–9, entitled "Tunable Grating Device and Optical Communication Devices and Systems Comprising Same", filed on Sep. 23, 1999, Serial No. 09/159,380 Now US Patent No. 6,055,348.

U. S. Patent Application of M. T. Fatehi 23–27, entitled Wavelength–Selective Optical Cross–Connect, Serial No. 09/123,085, filed on Jul. 27, 1998 Now US patent No. 6,067,389.

* cited by examiner

Primary Examiner—Phan T. H. Palmer
(74) Attorney, Agent, or Firm—Thomas J. Bean

(57) ABSTRACT

A multi-wavelength optical cross-connect switch architecture incorporates a plurality of wavelength-selective optical cross-connect (WSXC) switch fabrics that receive multi-wavelength input signals distributed by one or more optical slicers and generate multi-wavelength output signals that are combined by a plurality of optical combiners. The WSXC fabrics employ fiber Bragg gratings (FBGs) as wavelength-selective elements. Using this architecture, the number of multi-wavelength channels carried by each WSXC is reduced from the number of channels present in each multi-wavelength input signal. In addition, the wavelength spacing between adjacent channels carried by each WSXC is increased over the spacing between adjacent channels in each multi-wavelength input signal.

22 Claims, 7 Drawing Sheets

MULTI-WAVELENGTH SIGNAL PATH SPECTRA WITH NO SPECTRAL SLICING

FIG. 5B

MULTI-WAVELENGTH SIGNAL PATH SPECTRA WITH 1:4 SPECTRAL SLICING

OPTICAL WAVELENGTH-SPACE CROSS-CONNECT SWITCH ARCHITECTURE

TECHNICAL FIELD

This invention relates to optical networks, and more particularly, to optical cross-connect switches used for routing multi-wavelength optical signals.

BACKGROUND OF THE INVENTION

Optical networks are widely used to transport large volumes of telecommunications traffic. For example, systems employing wavelength division multiplexed (WDM) technology are capable of supporting dozens of communications channels transported at different wavelengths on just a single optical fiber.

In a multi-fiber network, some of the many channels on individual optical fibers may need to be selectively routed to other fibers. Selective routing may be required, for example, to balance communications traffic, or to avoid an out-of-service leg in the optical network. Such routing can be facilitated by interconnecting the individual optical fibers via an optoelectronic cross-connect switch. However, these switches suffer the disadvantage of requiring the multiple conversion of WDM signals first from optical form into electronic form and then back into optical form. It would be advantageous if the optical switching could be performed without these conversions.

Some cross-connect switch fabrics have been devised that enable WDM signals to be optically switched (see, e.g., U.S. patent application Ser. No. 09/123,085 now U.S. Pat. No. 6,067,389, entitled WAVELENGTH-SELECTIVE OPTICAL CROSS-CONNECT, assigned to Lucent Technologies Inc., having a filing date of Jul. 27, 1998). These fabrics typically use various optical filter technologies to "select" the optical channels to be routed (such filters also being referred to as "wavelength-selective elements"). However, filter performance factors such as insertion loss, "blue" wavelength loss and tuning range effectively limit the number of communications channels that can be supported by each fabric. For example, in wavelength-selective cross-connect (WSXC) fabrics employing tunable fiber Bragg gratings as wavelength selective elements to select optical channels with 50 gigahertz spacing, experience suggests a practical limit of about ten wavelength-selective elements per path through the fabric. As a result, optical WSXC fabrics have not been used to support large-scale optical cross-connect switch applications.

Thus, in order to employ current optical switching components (such as WSXC fabrics) in large-scale optical cross-connect switch applications, an optical cross-connect switch architecture is required that is capable of switching optical signals with a large number of optical channels while requiring only a small number of wavelength-selective elements on each signal path through the switch.

SUMMARY OF THE INVENTION

The number of wavelength-selective elements required on each signal path through an optical cross-connect switch is substantially reduced in a novel optical cross-connect switch architecture employing multiple WSXC fabrics. One or more optical channel distributors each receive a multi-wavelength optical signal as input. Each signal contains a plurality of channels, each associated with one or a plurality of wavelengths. Each distributor distributes each channel in its associated multi-wavelength input signal to one of a plurality P of WSXC fabrics. Each WSXC fabric is arranged to receive channels from the one or more distributors that are associated with a unique subset of the plurality of wavelengths.

Upon receiving the distributed channels, each WSXC fabric employs wavelength-selective elements on each of a plurality of WSXC fabric cross-paths to route each received channel to one of a plurality of optical combiners. Each combiner then combines the channels it receives from each WSXC fabric to produce and output a multi-wavelength optical signal with a full complement of channels. By employing this architecture, the number of channels carried by each WSXC fabric cross-path is reduced by a factor of P over the number of channels present in the multi-wavelength input and output signals.

In an exemplary embodiment of the invention, the distributors comprise optical slicers and the wavelength-selective elements comprise tunable fiber Bragg gratings (FBGs). The FBGs are tunable to reflect or pass optical signals in associated channels. The optical slicers operate to cause the optical channels associated with each multi-wavelength input signal to be allocated to the individual WSXC fabrics such that spacing between adjacent channels on each fabric is increased over spacing between adjacent channels in the input signal. This added spacing provides a "parking space" to which FBGs associated with adjacent channels may be tuned, thus enabling signals to pass in the adjacent channels. In addition, the added spacing reduces the effects of overlapping "blue" wavelength losses contributed by the FBGs on each path.

BRIEF DESCRIPTION OF THE DRAWING

The invention will be more fully understood from the following detailed description taken in connection with the accompanying drawing, in which.

Figure 2:
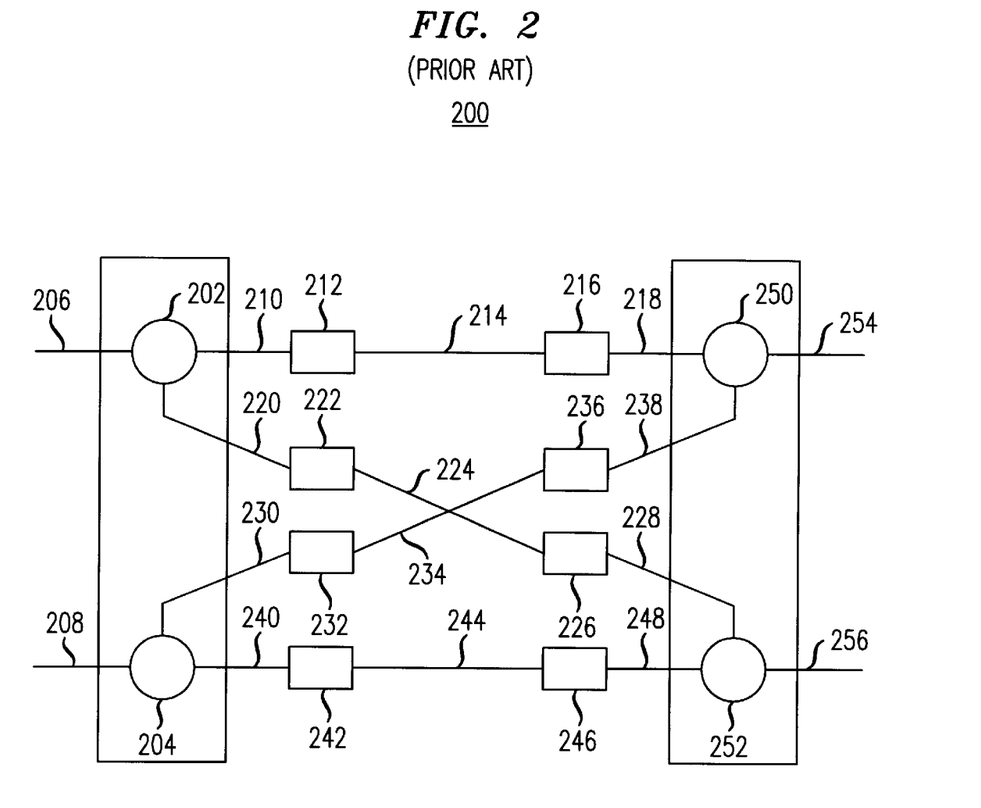
FIG. 2 provides a schematic diagram for a prior art wavelength-selective cross-connect fabric.
Figure 3:
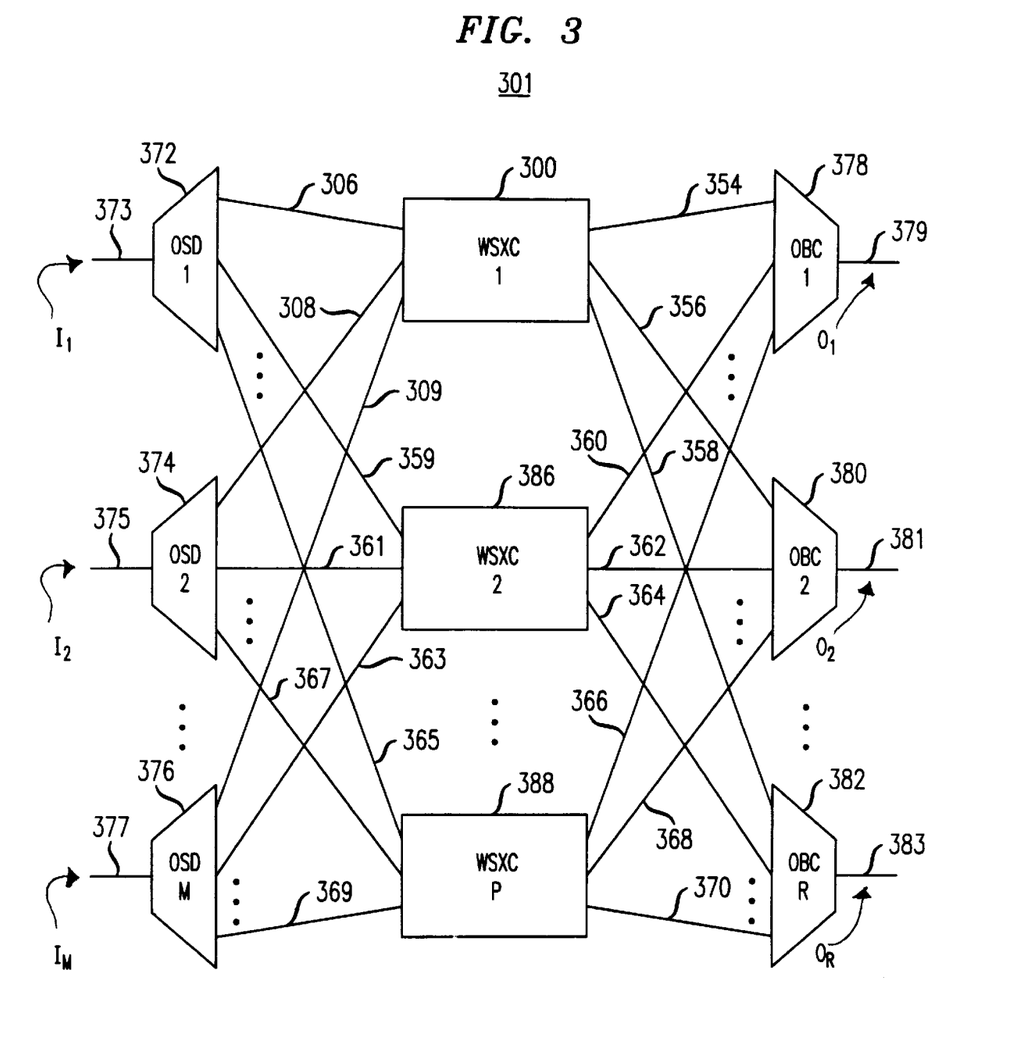
FIG. 3 presents a schematic diagram of a preferred embodiment of the present invention.

For consistency and ease of understanding, those elements of each figure that are similar or equivalent share identification numbers that are identical in the two least significant digit positions (for example, WSXC input 206 of FIG. 2 and WSXC input 306 of FIG. 3).

DETAILED DESCRIPTION

Figure 1:
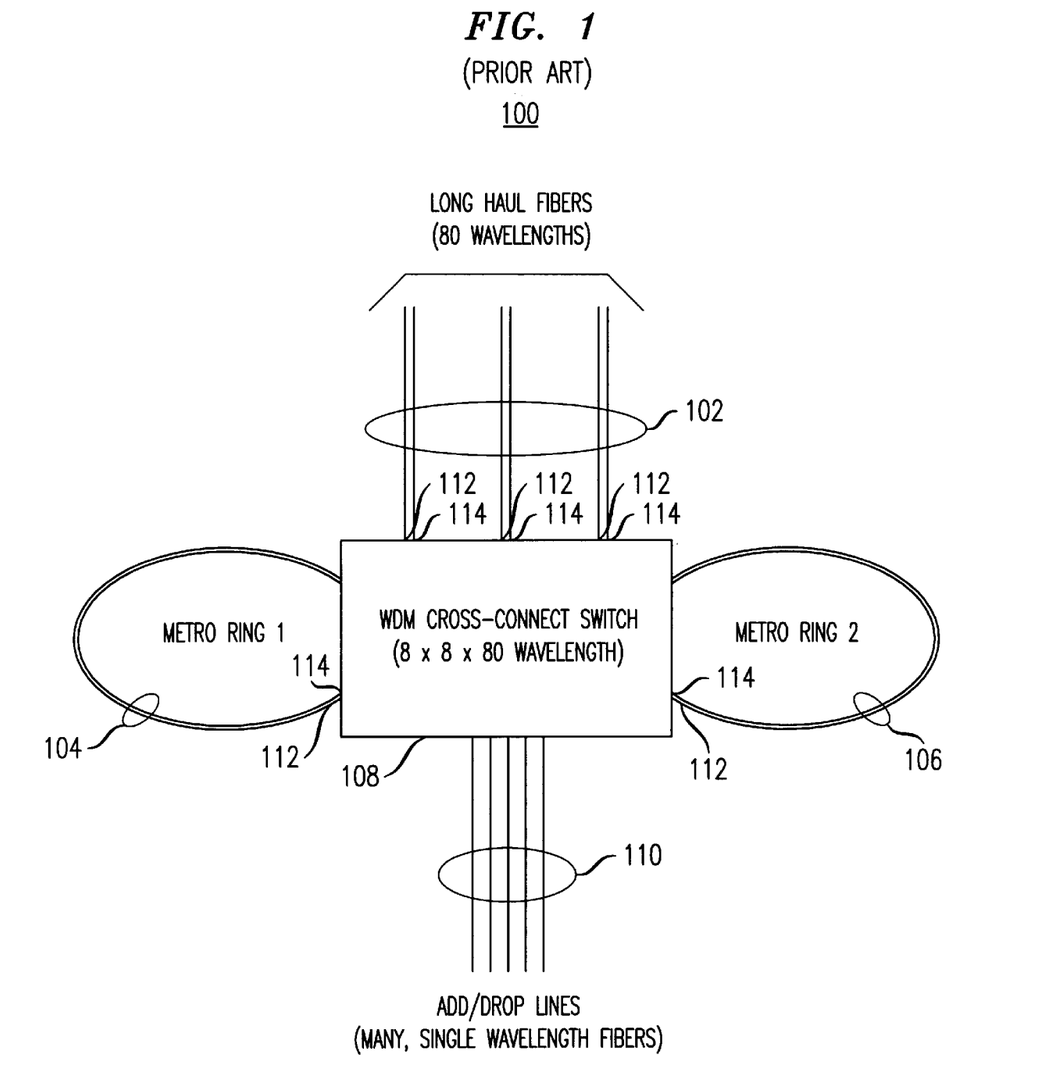
FIG. 1 depicts a typical prior art large-scale optical network employing an electronic cross-connect switch.

In order to better understand the principles of the present invention, several key aspects of the cross-connect switch prior art are first reviewed. FIG. 1 illustrates a typical architecture for an optical network 100. The network 100 includes long-haul optical fibers 102, a first metro ring 104, a second metro ring 106, and add/drop lines 110. Optical signals directed to and from these elements of the network 100 are routed by a cross-connect switch 108.

Cross-connect switches supporting large-scale optical networks must have significant capacities. In network 100, for example, cross-connect switch 108 is configured to switch multi-wavelength signals among three fiber pairs 102 carrying eighty channels each, two bi-directional metro rings 104 and 106 carrying forty channels each, and a variety of single-wavelength add/drop lines 110. To date, such large-scale optical cross-connect switches typically operate to transform optical signals into electronic signals that are switched and routed electronically. For example, in optical network 100, cross-connect switch 108 receives optical signals at switch input ports 112, transforms these optical signals into electronic signals, routes the electronic signals within switch 108, transforms the routed electronic signals into optical signals, and delivers the transformed optical signal from switch output ports 114.

Although such optoelectronic optical cross-connect switches provide significant switching capacities, they suffer the disadvantage of requiring the multiple conversion of multi-wavelength WDM signals first from optical form into electronic form and then back into optical form. It would be advantageous if the optical switching could be performed without these conversions.

Some cross-connect switch fabrics have been devised that enable WDM signals to be optically switched (see, e.g., U.S. patent application Ser. No. 09/123,085 now U.S. Pat. No. 6,067,389 entitled WAVELENGTH-SELECTIVE OPTICAL CROSS-CONNECT, assigned to Lucent Technologies inc., having a filing date of Jul. 27, 1998). FIG. 2 illustrates the operation of an optically switched wavelength-selective optical cross-connect (WSXC) fabric 200. In FIG. 2, WSXC fabric 200 is arranged to switch a multi-wavelength optical signal of two channels arriving at input 206. Optical coupler 202 routes copies of the WDM input signal received at input 206 to links 210, 220. Link 210 interconnects to wavelength-selective element 212, which further interconnects to optical combiner 250 via link 214, a second wavelength-selective element 216 and link 218. Wavelength-selective elements 212 and 216 are each controllable either to filter one of the two WDM channels in the optical signal received at the input 206 such that the filtered channel does not reach optical combiner 250 and output 254. Accordingly, by appropriately controlling elements 212 and 216, neither, one or both channels may pass on to optical combiner 250 and output 254.

Similarly, link 220 interconnects and establishes a path to optical combiner 252 via wavelength-selective element 222, link 224, wavelength-selective element 226 and link 228. Wavelength-selective elements 222 and 226 are each controllable to filter one of the two WDM channels in the optical signal received at the input 206. Again, by appropriately controlling elements 222 and 226, neither, one or both channels may pass on to optical combiner 252 and output 256.

Following a similar path, two channels in a WDM signal arriving at an input 208 may be selectively filtered or passed on to output 254 over a path including links 230, 234 and 238, wavelength-selective elements 232 and 236 and optical combiner 250. In addition, these channels may be selectively filtered or passed on to output 256 over a path including links 240, 244 and 248, wavelength-selective elements 242 and 246 and the optical combiner 252. In this manner, each of the WDM channels at inputs 206 and 208 may be filtered or passed on to each of the outputs 254 and 256, respectively.

Generally, the WSXC fabric 200 will receive signals at inputs 206 and 208 comprising channels centered at equivalent wavelengths $\lambda$. For example, each of the signals at inputs 206 and 208 may comprise a first channel centered at a wavelength $\lambda_1$ and a second channel centered at a wavelength $\lambda_2$. By operation of WSXC fabric 200, at most one of each of the input signal channels centered at wavelengths $\lambda_1$ and $\lambda_2$ will typically be forwarded to outputs 254 and 256. Accordingly, each of the signals at outputs 254 and 256 will contain at most two channels, and these two channels will be centered at wavelengths $\lambda_1$ and $\lambda_2$, respectively. For example, WSXC fabric 200 may operate such that the $\lambda_1$ channel from the signal at input 206 and the $\lambda_2$ channel from the signal at input 208 are forwarded to comprise the signal at output 254.

As the number of channels in an associated WDM signal grows, the complexity of WSXC fabric 200 increases. Each additional input channel requires that an additional wavelength-selective element be placed in each WSXC path between inputs 206, 208 and outputs 254, 256. For example, a WSXC fabric supporting four input signals each containing 20 channels would require 20 wavelength-selective elements on 16 paths, or 320 wavelength selective elements in total. Significantly impacted by filter performance factors such as insertion loss, "blue" wavelength loss and tuning range, such large fabric configurations are currently impractical.

However, a large-scale optically-switched optical cross-connect switch can be realized, for example, by incorporating a plurality of conventional optical WSXC fabrics in a novel optical cross-connect switch architecture 301 shown in FIG. 3. This architecture is the subject of the present invention, and is described in further detail below.

Included in the cross-connect switch architecture 301 is a series of optical WSXC fabrics 300, 386 and 388 that each receive optical signals provided by a series of optical branch elements 372, 374 and 376. Optical WSXC fabrics 300, 386, and 388 of this type operate according to the principles outlined for the WSXC fabric 200 of FIG. 2, and are well-known in the art (see, e.g., Daniel Y. Al-Salameh et al., "Optical Networking," Bell Labs Technical Journal, Vol. 3, No. 1, January–March 1998, pg. 57). Optical branch elements 372, 374 and 376 may be optical band demultiplexers commercially available, for example, from JDS FITEL Inc.

Optical branch element 372 receives a first multi-wavelength optical input signal $I_1$, at input 373. Signal $I_1$ comprises N channels. Optical branch element 372 demultiplexes the signal $I_1$, into a plurality of signals each containing one or more of the N channels. Each of plurality of signals is delivered to one of the WSXC fabrics 300, 386 or 388 over links 306, 359 or 365, respectively.

A similar arrangement is configured for each additional signal $I_2$ through $I_M$. For example, the signal $I_2$ is received at an input 375 and demultiplexed by the optical branch element 374 into a second plurality of signals each containing one or more of N channels Each of the second plurality of signals is delivered over one of the links 308, 361 or 367 to the WSXC fabrics 300, 386 or 388, respectively.

Also included in the optical cross-connect switch architecture are a series of optical combiners 378, 380 and 382 that each receive optical signals outputted by the WSXC fabrics 300, 386 and 388, respectively. Optical combiners 378, 380 and 382 may comprise, for example, optical combiners, optical wavelength multiplexers, inverse optical band demultiplexers or inverse optical slicers. Optical wavelength multiplexers are well-known in the art and are commercially available, for example, from JDS FITEL Inc.

In FIG. 3, multiplexer 378 produces a first multi-wavelength optical signal $O_1$ over an output 379 that is formed from a plurality of N channels. The N channels are delivered by the WSXC fabrics 300, 386 and 388 over links 354, 360 and 366, respectively. Multi-wavelength optical signals $O_2$ through $O_R$ are produced in a similar fashion by multiplexers 380 through 382, respectively.

By means of the cross-connect switch architecture 301 of FIG. 3, a component signal in a selected channel in one of the input signals $I_M$ may be directed to a selected channel in one of the output signals $O_R$, such that the selected input channel and the selected output channel are both associated with a common wavelength. For example, a component signal in signal $I_2$ associated with a wavelength $\lambda_2$ may be directed over link 361, through WSXC fabric 386, over link 360 and through optical combiner 378 to a channel in output signal $O_1$ associated with wavelength $\lambda_2$. Alternatively, a component signal in the input signal $I_M$ associated with a wavelength $\lambda_3$ may be directed over link 369, through WSXC fabric 388, over link 368 and through optical combiner 382 to a channel in output signal $O_R$ associated with wavelength $\lambda_3$. Significantly, any number of channels N in each of the input signals $I_M$ and output signals $O_R$ is effectively accommodated so long as:

$$P > N/Q \qquad (1)$$

Where P represents the number of WSXC fabrics incorporated in the cross-connect switch architecture 301 of FIG. 3, and Q is equal to the a maximum number of wavelength-selective elements associated with each of the WSXC fabrics 300, 386 and 388.

In the cross-connect switch architecture 301 of FIG. 3, the number of input signals $I_M$ may differ from the number of output signals $O_R$. This asymmetry may result, for example, in cases where additional signals of one or more channels are added or dropped at add/drop ports are incorporated in the WSXC fabrics 300, 386 or 388.

The advantages of the present invention are particularly apparent in large-scale multi-wavelength cross-connect system applications (for example, as depicted in FIG. 1). Here, the number of optical channels that can be transported over a single optical fiber far exceed the limited number of wavelength-selective elements that can be practically placed in each path of a WSXC fabric. These limitations arise, for example, from performance characteristics of the wavelength-selective elements such as insertion losses, "blue" wavelength losses and channel spacing.

Insertion losses accumulate additively according to the number of wavelength-selective elements present on a path. Per-element insertion losses may vary, for example, from about 0.1 dB for tunable FBGs to as much as 8 dB for arrayed waveguide gratings (see, e.g., D. Sadot et al., "Tunable Optical Filters for Dense WDM Networks," IEEE Communications Magazine, December 1998). Because of their low insertion loss and ease of tuning, FBGs are employed in a preferred embodiment of the invention as the wavelength-selective elements of the WSXC fabrics 300, 386, 388 of FIG. 3.

Although favored because of low insertion losses, the number of tunable FBGs that can be placed in a path through a WSXC fabric is limited by other characteristic losses. FBGs are designed to attenuate optical signals at wavelengths within a sharply-defined interval centered at a characteristic wavelength. While attenuation at wavelengths above this range is generally negligible, FBGs may attenuate optical signals by as much as 5 dB across a broad range of wavelengths below the attenuation interval (in a region referred to as the "blue" wavelength region).

Figure 6A:
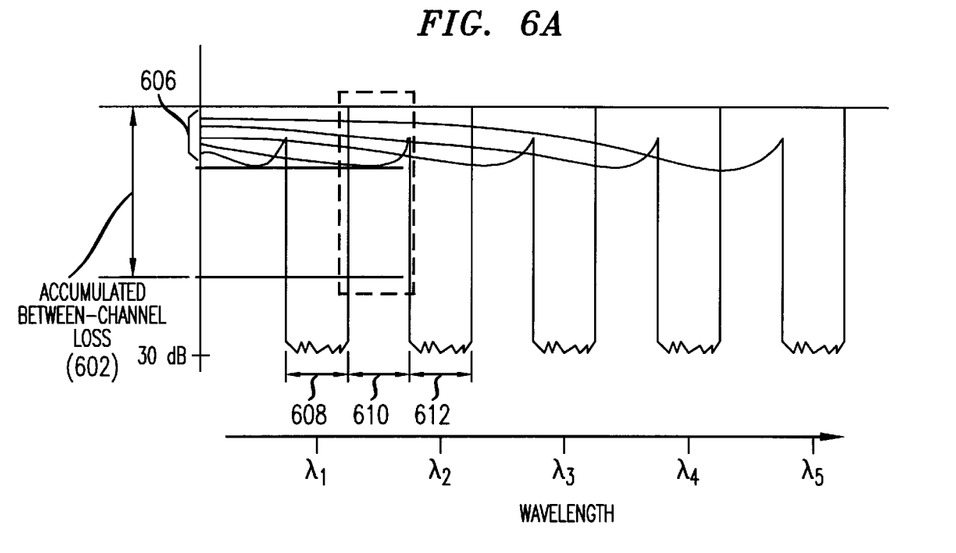
FIGS. 6A, 6B illustrate a second advantage of optical wavelength slicers used in the present invention by showing "blue" wavelength losses for sliced and non-sliced signals.

To further illustrate the effect of "blue" wavelength losses, FIG. 6A shows an attenuation profile for a series of five FBGs on a single transmission path. The five FBGs are centered at wavelengths $\lambda_1$ through $\lambda_5$, respectively. "Blue" wavelength losses are shown in a region 610 below an attenuation interval 612. Losses in this region are attributable to FBGs centered at wavelengths $\lambda_2$ through $\lambda_5$, and accumulate to produce a between-channel loss 602 in the region 610. Accordingly, this "blue" wavelength loss limits the number of FBGs that can effectively be placed in a single WSXC path. Experience suggests a current limit of about ten FBGs.

In addition, the number of tunable FBGs that can be placed in a WSXC path is limited by wavelength spacing. Tunable FBG's operate to reflect light at a specified wavelength. Light at this wavelength can be made to pass through the FBG by changing the properties of the FBG ("tuning") so that light is reflected instead at an alternate wavelength. Methods for tuning FBGs include applying thermally-induced or piezoelectrically-induced strains (see, e.g., S. Jin et al., "Broad-range, latchable reconfiguration of Bragg wavelength optical gratings," Applied Physics Letters, Vol. 74, No. 16, Apr. 19, 1999). If a multi-wavelength signal on a WSXC path is intended to pass over the path unfiltered, each of the FBGs on the WSXC path must be tuned to a wavelength not present in the signal. FBGs are typically limited to a tuning range of less than 10 nanometers (see, e.g., D. Sadot et al., "Tunable Optical Filters for Dense WDM Networks," IEEE Communications Magazine, December 1998). For multi-wavelength signals containing adjacent channels with limited wavelength spacing between channels, each FBG on a WSXC path must be tuned to a wavelength outside of the aggregate pass band in order for the a signal in an associated channel to pass. Where individual channels may be spaced, for example, 1.5 nanometers apart, the number of channels (and FBGs) on a path is effectively limited to six.

However, limitations on the number of FBGs inserted in each WSXC path may be accommodated by the inventive optical cross-connect switch architecture of FIG. 3. By employing the demutiplexers 372, 374 and 376, the multiplexers 378, 380 and 382 and the additional WSXC fabrics 386 and 388, for multi-wavelength signals with a given number of channels, the number of WSXC paths may be increased in order to decrease the number of WSXC elements required on each path. In particular, for a system configuration switching N optical channels on M incoming fibers to R outgoing fibers, M 1xP optical branch elements, P WSXC fabrics and R Px1 multiplexers may be interconnected as shown in FIG. 3 to reduce the number of FBGs required on each cross path from N to N/P. As a result, the number of multi-wavelength channels that can be switched on each incoming optical fiber is increased over prior systems by a factor of P.

Notably, in addition, filter limitations imposed by channel spacing requirements are eased in a preferred embodiment of the inventive optical cross-connect switch architecture 301 of FIG. 3 in which the optical signal distributors 372, 374 and 376 are selected to be optical wavelength slicers. Optical slicers are well-known in the art (see, e.g., see, e.g., U.S. Pat. No. 5,694,234, entitled WAVELENGTH DIVI- SION MULTIPLEXING PASSIVE OPTICAL NETWORK INCLUDING BROADCAST OVERLAY, having an issue date of Dec. 2, 1997) and are commercially available, for example from Chorum Technologies Inc. Optical slicers typically inject smaller insertion losses in the signal stream than other branch elements (for example, slicer insertion losses may be on the order of 2 dB while band demultiplexer insertion losses may be on the order of 8 dB). In addition, optical wavelength slicers effectively allocate optical channels to slicer outputs in a manner that maximizes spacing between adjacent channels on each slicer output.

Figure 4:
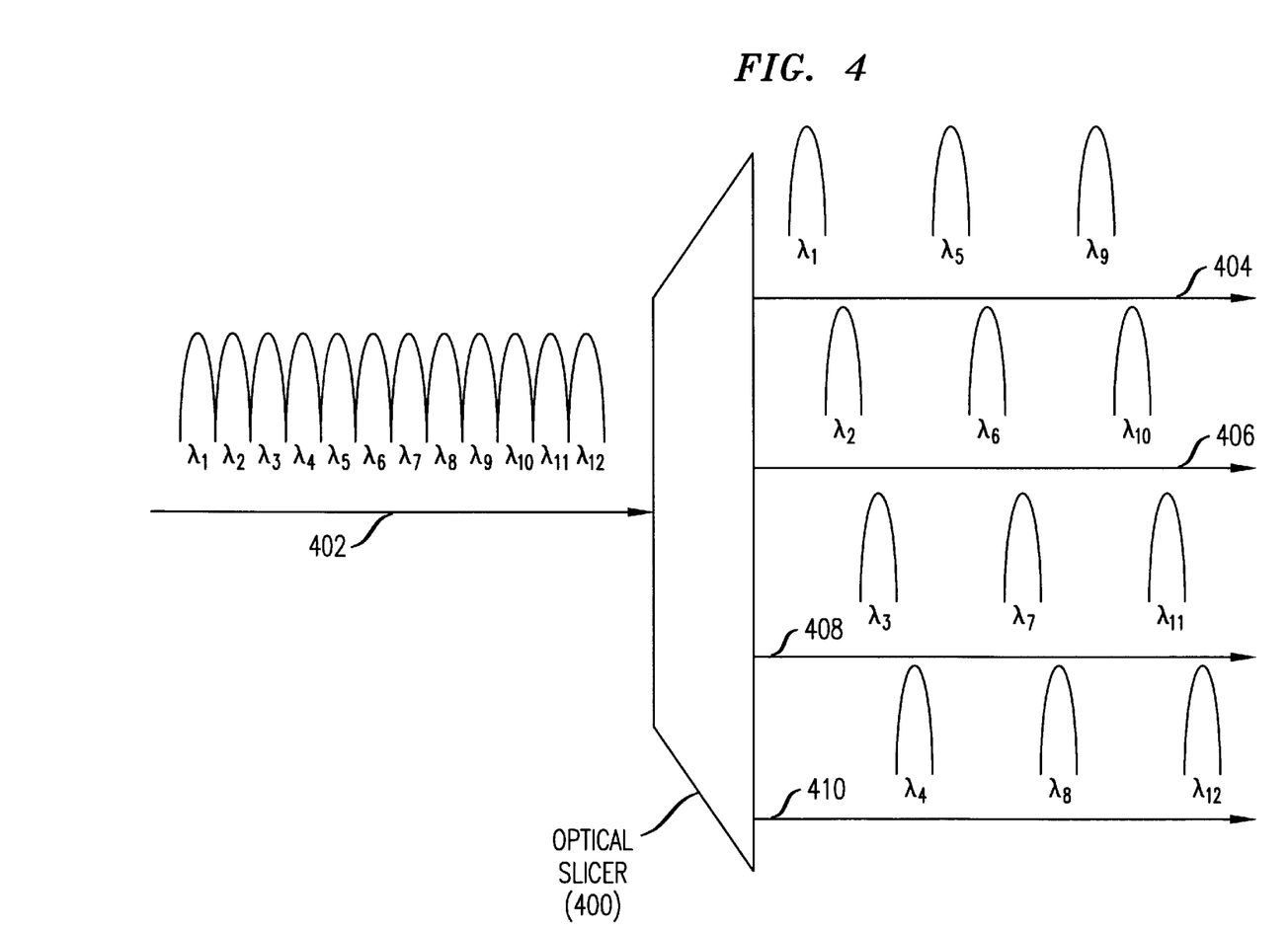
FIG. 4 depicts the operation of an optical wavelength slicer suitable for use in the present invention.

FIG. 4 illustrates this spacing effect by examining the operation of a 1x4 optical slicer 400. Input 402 to optical slicer 400 carries a multi-wavelength optical signal including channels centered at adjacent wavelengths $\lambda_1$ through $\lambda_{12}$. Optical wavelength slicer 400 allocates the channels at adjacent wavelengths $\lambda_1$, through $\lambda_4$ to outputs 404, 406, 408 and 410, respectively. This allocation pattern is repeated for subsequent adjacent channel sets $\lambda_5$ through $\lambda_8$ and $\lambda_9$ through $\lambda_{12}$. As a result, adjacent channels placed on the outputs 404, 406, 408 and 410 have a spacing between wavelengths associated with adjacent channels that is that is four times as large as the spacing between wavelengths associated with adjacent channels on the input 402. More generally, in a 1xP optical wavelength slicer, spacing between wavelengths associated with adjacent channels is increased by a factor of P.

Figure 5A:
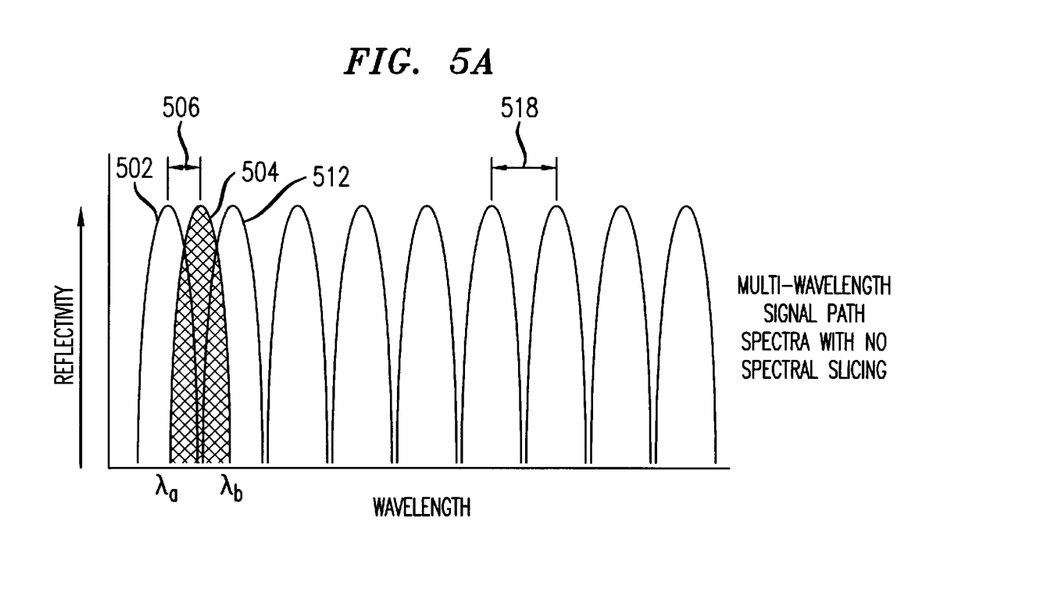
FIGS. 5A, 5B illustrate a first advantage of optical wavelength slicers used in the present invention by showing channel spacing for sliced and non-sliced signals.
Figure 5B:
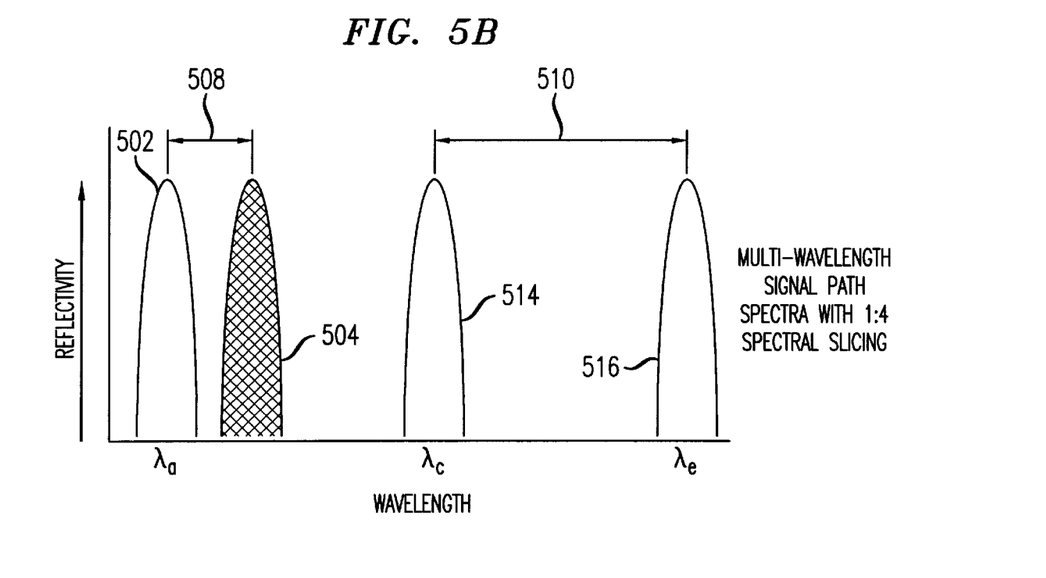

FIGS. 5A, 5B illustrate some of the benefits derived from the additional spacing generated by the 1x4 optical slicer 400 of FIG. 4. FIG. 5A shows signal reflectivity as a function of optical wavelength for a non-"sliced" optical path incorporating a plurality of FBGs. Envelope 502 characterizes optical signal reflectivity for a first FBG with an attenuation interval centered at a wavelength $\lambda_a$. Envelope 512 similarly characterizes optical signal reflectivity for a second FBG with an attenuation interval for an adjacent channel centered at a wavelength $\lambda_b$. In order to transmit a signal in a channel associated with the wavelength $\lambda_a$ (i.e., to pass the signal through the first FBG), the first FBG must be tuned to shift the envelope 502 so that reflectivity is low near $\lambda_a$. Envelope 504 illustrates this shift.

Because channel spacing 508 between $\lambda_a$ and $\lambda_b$ is limited, the first FBG must be tuned carefully. If envelope 504 is shifted a distance 506 that is too far, it will attenuate the transmission of a channel associated with $\lambda_b$. If distance 506 is too little, the shift will be insufficient to enable the transmission of the channel associated with $\lambda_a$.

Channel spacing limitations are largely eliminated by selecting optical slicers (such as the optical slicer 400 of FIG. 4) as the optical signal distributors 372, 374 and 376 of FIG. 3. FIG. 5B illustrates reflectivity as a function of wavelength for one of the output signals of optical slicer 400 of FIG. 4. In FIG. 5B, channel spacing 510 is increased by a factor of four over channel spacing 518 for the non-sliced input signals of FIG. 5A. As a result, envelope 504 can more easily be shifted a distance 508 away from the region defined by envelope 502 without impinging on the region for adjacent channel $\lambda_c$ as characterized by envelope 514.

Figure 6B:
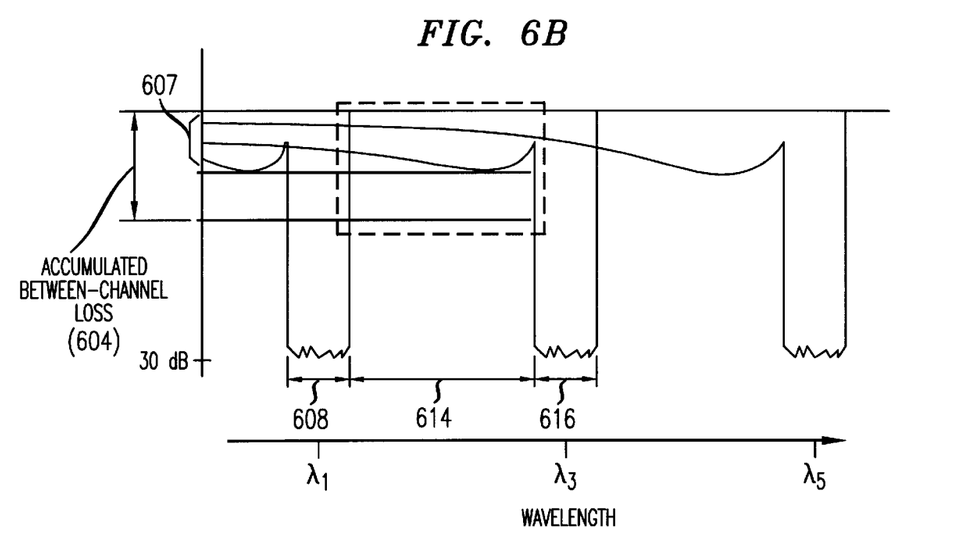

In addition to generating additional spacing between adjacent channels, optical slicers provide the additional benefit of reducing "blue" wavelength losses. FIG. 6B shows signal losses as a function of wavelength for a "sliced" WSXC fabric path containing three FBGs (not shown) centered at wavelengths $\lambda_1$, $\lambda_3$ and $\lambda_5$, respectively. This path has been configured to receive a multi-wavelength signal input from a 1x2 slicer output. FIG. 6B can be compared to FIG. 6A, which shows signal losses for a WSXC fabric path containing five FBGs centered at wavelengths $\lambda_1$ through $\lambda_5$, respectively. The WSXC fabric path of FIG. 6A is configured to receive a non-"sliced" signal input.

As compared to FIG. 6A, region 614 of FIG. 6B between adjacent FBG attenuation intervals 608 and 616 is twice as large as region 610 between the adjacent FBG attenuation intervals 608 and 612 of FIG. 6A. Using a suitably large 1xP slicer, the region 614 provides an ample "parking lot" for shifting the attenuation interval 608 without affecting adjacent channels. For example, with channel spacing of 50 gigahertz and P equal to 8, a spectral separation of 400 gigahertz is created.

In addition, accumulated "blue" wavelength losses between attenuation intervals are improved in the configuration of FIG. 6B. In FIG. 6B, an accumulated "blue" wavelength loss 604 is shown as the sum of losses 607 arising in the region 614 from FBGs centered at wavelengths $\lambda_3$ and $\lambda_5$. This accumulated "blue" wavelength loss 604 is substantially less, for example, than the accumulated "blue" wavelength loss 602 shown in the non-"sliced" configuration of FIG. 6A.

Figure 7:
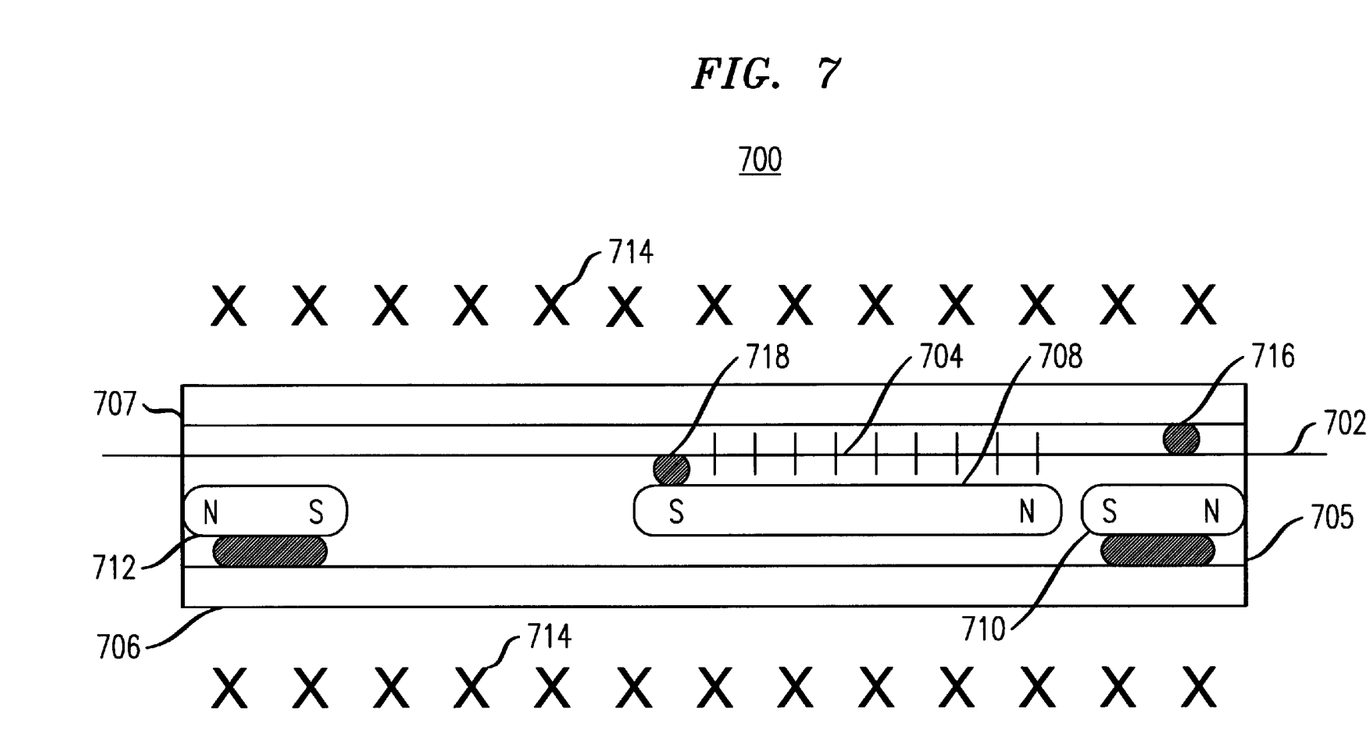
FIG. 7 shows a bi-stable reconfigurable fiber Bragg grating suitable for use in the present invention as a wavelength-selective element.

A variety of FBG configurations may be used in support of the present invention. For example, FIG. 7 provides a cross-sectioned view illustrating a tunable, bi-stable FBG 700 (see, e.g., U.S. patent application Ser. No. 09/159,380 now U.S. Pat. No. 6,055,348, entitled TUNABLE GRATING DEVICE AND OPTICAL COMMUNICATIONS DEVICES AND SYSTEMS COMPRISING THE SAME, assigned to Lucent Technologies Inc., having a filing date of Sept. 23, 1998). While bi-stable FBG 700 represents a preferred embodiment for the wavelength-selective elements employed by the present invention, it will be clear to one skilled in the art that a variety of other wavelength-selective elements may alternatively be employed.

Bi-stable FBG 700 includes an optical fiber 702 incorporating a Bragg grating 704, both disposed within guiding tube 706. Fiber 702 is affixed to guiding tube 706 at a point 716 near distal end 705 of guiding tube 706. Also disposed within and affixed near opposing distal ends 705 and 707, respectively, of guiding tube 706 are fixed magnets 710 and 712. An axially magnetized programmable magnet 708 is movable between magnets 710 and 712, and affixed to optical fiber 702 at a point 718. Point 718 is centrally positioned with respect to distal ends 705, 707, such that Bragg grating 704 is substantially positioned between the points 716, 718. Guiding tube 706 is further encapsulated by solenoid 714.

As shown in FIG. 7, the adjacent poles of movable magnet 708 and fixed magnet 710 are of opposite polarity and the adjacent poles of movable magnet 708 and fixed magnet 712 are of like polarity. This causes an attractive force to be generated between movable magnet 708 and fixed magnet 710 and a repulsive force to be generated between movable magnet 708 and fixed magnet 712. As a result, movable magnet 708 moves toward fixed magnet 710, and a compressive strain $\epsilon_c$ (not shown) is generated in optical fiber 702 within the region of Bragg grating 704.

A pulse current may be applied to solenoid 714 to invert the polarity of movable magnet 708 so that adjacent poles of movable magnet 708 and fixed magnet 710 are of like polarity and adjacent poles of movable magnet 708 and fixed magnet 712 are of opposite polarity. As a result, an attractive force is generated between movable magnet 708 and fixed magnet 712 and a repulsive force is generated between movable magnet 708 and fixed magnet 710. This causes movable magnet 708 to move toward fixed magnet 712, generating a tensile strain $\epsilon_t$ (not shown) in optical fiber 702 within the region of Bragg grating 704. A second pulse current may be applied to invert the polarity of magnet 708 to return once more to its initial condition. Control units for pulsing solenoid 714 in this manner are well-known in the art.

Movable magnet 708 is made of a material that retains a large portion of an induced magnetization after an inducing field is removed (for example, an iron-chromium-cobalt alloy). Thus, a single pulse in solenoid 714 is sufficient to set the polarity of magnet 708 and place device 700 into one of two bi-stable states. The strains $\epsilon_c$, $\epsilon_t$ induce a shift in the wavelength attenuation interval of FBG 700 that is related both to the strains and to a photoelastic constant representing the effect of the strains on the refractive index of the fiber.

The exemplary embodiment described above is but one of a number of alternative embodiments of the invention that will be apparent to those skilled in the art in view of the foregoing description. Accordingly, this description is to be construed as illustrative only, and is for the purpose of teaching those skilled in the art the best mode of carrying out the invention. Various other alternatives can be devised by a worker skilled in the art without departing from the teachings of this invention. For example, instead of tuning FBGs, optical "cross-bar" bypass switches may be employed to switch FBGs into and out of a signal path (see, e.g., U.S. Pat. No. 5,712,932, issued to Alexander et al. on Jan. 27, 1998). Alternatively, Fabry Perot etalons tunable by microelectromechanical switches (MEMS) may be used to replace FBGs as wave-selective elements (such devices are commercially available, for example, from CoreTek, Inc.). The inventive optical cross-connect switch architecture 301 of FIG. 3 may also be adapted to include additional ports to provide an add/drop function, optical isolators to eliminate stray signals reflected by the FBGs, and optical amplifiers to overcome insertion and other losses. Also, the optical combiners 378, 380 and 382 of FIG. 3 may be replaced, for example, by optical multiplexers, star couplers, inverse optical band demultiplexers or inverse optical slicers

What is claimed is:

1. A method for routing a plurality of component signals in one or more multi-wavelength optical input signals among a plurality of multi-wavelength output signals, wherein each component signal of the one or more multi-wavelength optical input signals is carried in one of a plurality of optical channels and each optical channel is associated with one of a plurality of optical wavelengths, the method comprising the steps of:
    distributing the plurality of component signals in the one or more multi-wavelength optical input signals among a plurality of optical wavelength-selective cross-connect (WSXC) fabrics, such that component signals carried in each optical channel associated with a selected one of the plurality of optical wavelengths are distributed to a selected one of the plurality of WSXC fabrics;
    routing distributed component signals from each WSXC fabric to one or more of a plurality of optical combiners; and
    combining routed component signals received at each of the plurality of combiners to form a plurality of multi-wavelength output signals.

2. The method of claim 1, wherein the plurality of component signals are distributed by one or more optical slicers, each slicer distributing component signals in respective channels among a plurality of slicer outputs, the component signals being distributed such that spacing between wavelengths associated with adjacent channels at each slicer output is increased over spacing between wavelengths associated with adjacent channels in the received multi-wavelength optical signal.

3. The method of claim 1, wherein an additional signal containing one or more component signals to be routed by a WSXC fabric is received at an add port of the WSXC fabric.

4. The method of claim 1, wherein one or more component signals are routed in a WSXC fabric to a drop port of the WSXC fabric.

5. An optical cross-connect switch capable of distributing a plurality of multi-wavelength optical signals, each multi-wavelength optical signal including a plurality of component signals, wherein each component signal is carried in an optical channel associated with one of a plurality of optical wavelengths, the optical switch comprising:
    a plurality of optical channel distributors, wherein each of the plurality of distributors receives one of the plurality of multi-wavelength signals and distributes the plurality of component signals in the received multi-wavelength signal among a plurality of optical distributor outputs, such that, for two or more of the plurality of distributors, a component signal carried in an optical channel associated with a selected one of the plurality of optical wavelengths is distributed to a selected one of the plurality of distributor outputs;
    a plurality of optical wavelength-selective cross-connect (WSXC) fabrics for routing component signals, wherein each WSXC fabric is interconnected to an output of one or more of the plurality of optical channel distributors, and the selected outputs for the two or more distributors are interconnected to a selected one of the plurality of WSXC fabrics; and
    a plurality of optical channel combiners, wherein each combiner includes a plurality of inputs for receiving component signals routed to the combiner by the WSXC fabrics and each combiner outputs a multi-wavelength optical signal comprising a superposition of component signals routed to the combiner.

6. The optical cross-connect switch of claim 5, wherein each of the plurality of optical channel distributors is an optical band demultiplexer.

7. The optical cross-connect switch of claim 5, wherein each of the plurality of optical channel distributors is an optical slicer, each slicer distributing received component signals in associated optical channels among P slicer outputs, the component signals being allocated such that spacing between adjacent wavelengths for associated channels on each slicer output is increased over spacing between adjacent wavelengths for associated channels in the received multi-wavelength optical signal.

8. The optical cross-connect switch of claim 5, wherein the plurality of optical channel combiners are selected from the group consisting of optical multiplexers, star couplers and inverse optical slicers.

9. The optical cross-connect switch of claim 5, wherein each of the plurality of WSXC fabrics includes a plurality of cross-paths connecting WSXC fabric inputs to WSXC fabric outputs, and each of the plurality of paths further includes a plurality of wavelength-selective elements, each wavelength-selective element tunable to filter or pass one or more component signals appearing at an associated fabric input.

10. The optical cross-connect switch of claim 9, wherein the plurality of tunable wavelength-selective elements each comprise a fiber Bragg grating (FBG).

11. The optical cross-connect switch of claim 10, wherein each FBG is a bi-stable, magnetically-tunable FBG.

12. The optical cross-connect switch of claim 10, wherein each wavelength-selective element further comprises an optical cross-bar switch, said switch operable to cause one or more component signals appearing at an associated fabric input to be filtered by the FBG or to bypass the FBG.

13. The optical cross-connect switch of claim 9, wherein the plurality of tunable wavelength-selective elements each comprise a Fabry-Perot etalon and a microelectromechanical system (MEMS) optical switch.

14. The optical cross-connect switch of claim 9, wherein one or more of the WSXC fabrics further comprises an additional fabric input for selectively adding one or more component signals to a cross-path.

15. The optical cross-connect switch of claim 9, wherein one or more of the WSXC fabrics further comprises an additional fabric output for selectively dropping one or more component signals from a cross-path.

16. A method for assembling an optical cross-connect switch, wherein the switch includes a plurality of input ports M for receiving multi-wavelength optical signals as inputs and a plurality of output ports R for supplying multi-wavelength optical signals as outputs, each multi-wavelength optical signal including a plurality of component signals each carried in one of N optical channels, each channel being associated with one of N optical wavelengths, the method comprising the steps of:

selecting an integer P to be less than N and greater than or equal to the ratio of N to a number Q, wherein Q represents a maximum number of component signals that may be selected by an optical wavelength-selective cross-connect (WSXC) fabric;

interconnecting P MxR WSXC fabrics to M 1xP wavelength-selective optical signal distributors, such that one output from each distributor is interconnected to one input for each WSXC fabric; and interconnecting R Px1 optical signal combiners to the P WSXC fabrics, such that one output from each WSXC fabric is interconnected to one input for each combiner.

17. The method of claim 16, wherein each of the selected M 1xP wavelength-selective optical signal distributors is an optical band demultiplexer.

18. The method of claim 16, wherein each of the selected M 1xP wavelength-selective optical signal distributors is an optical slicer, each slicer allocating component signals and associated channels from a received multi-wavelength optical signal among a plurality of slicer outputs, the channels being allocated such that spacing between particular wavelengths associated with adjacent channels on each slicer output is increased by a factor of P over spacing between particular wavelengths associated with adjacent channels in the received multi-wavelength optical signal.

19. The method of claim 16, wherein the WSXC fabrics each comprise a plurality of wavelength-selective elements, the plurality of wavelength-selective elements being selected from the group consisting of tunable fiber Bragg gratings and tunable Fabry-Perot etalons.

20. The method of claim 16, wherein the optical signal combiners are selected from the group consisting of optical multiplexers, star couplers and inverse optical slicers.

21. The method of claim 16, further comprising the step of configuring one or more drop ports in one or more of the P MxR WSXCs.

22. The method of claim 16, further comprising the step of configuring one or more add ports in one or more of the P MxR WSXCs.

* * * * *